Dec. 30, 1969  W. T. BEDENK ET AL  3,486,908
PROCESS FOR PREPARING PASTRY CRUST MIXES
Filed June 16, 1966  2 Sheets-Sheet 1
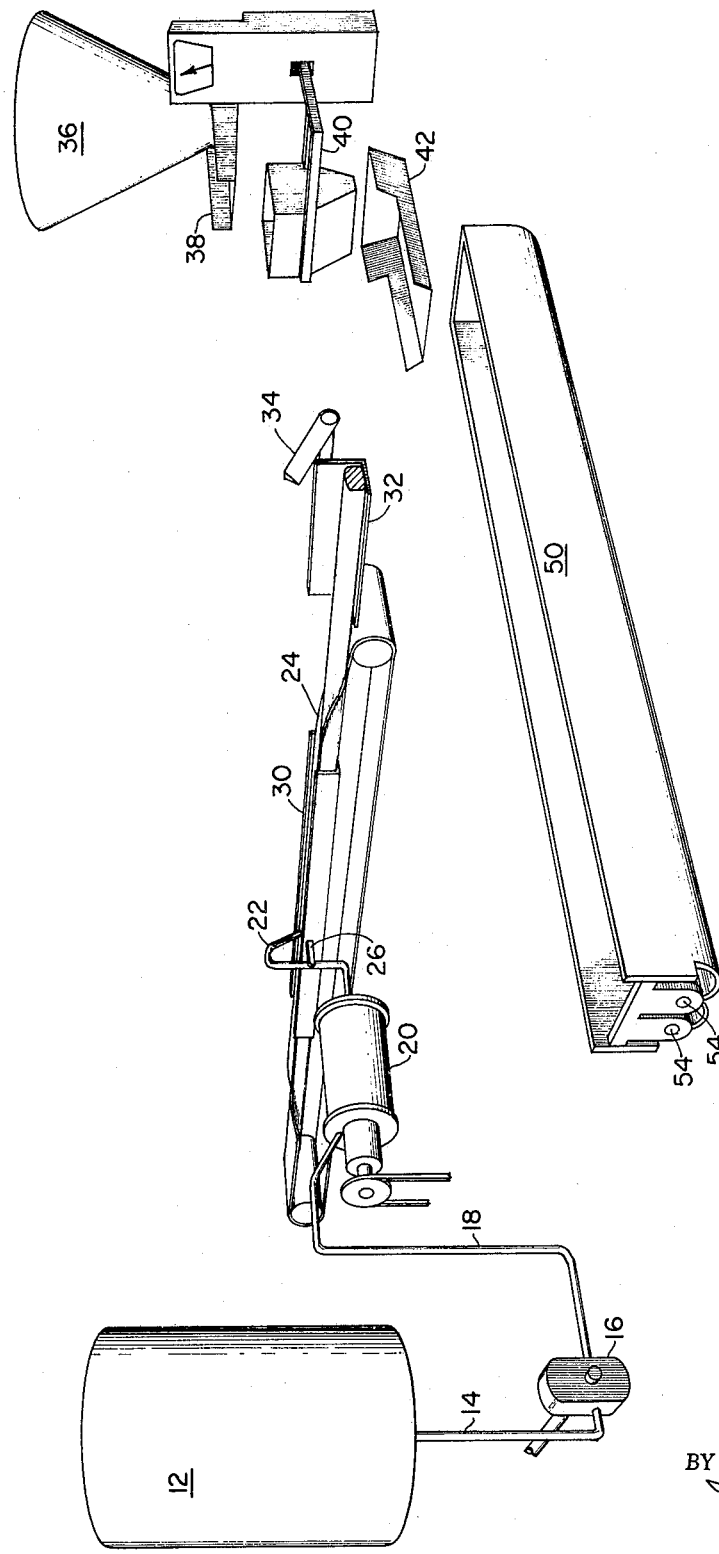
INVENTORS
William T. Bedenk
James E. Luebering
BY Thomas J. Flaherty
Oris S. Spector
ATTORNEYS

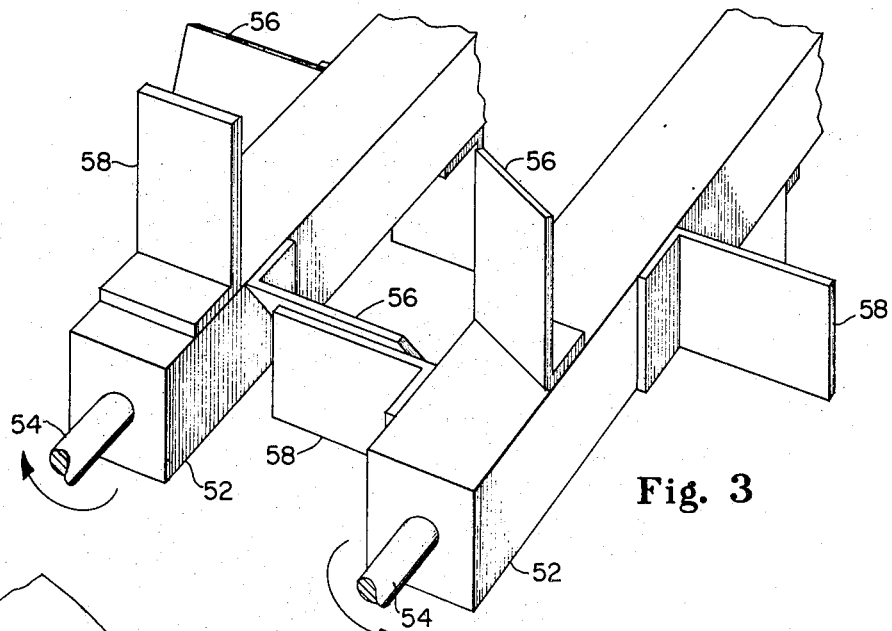
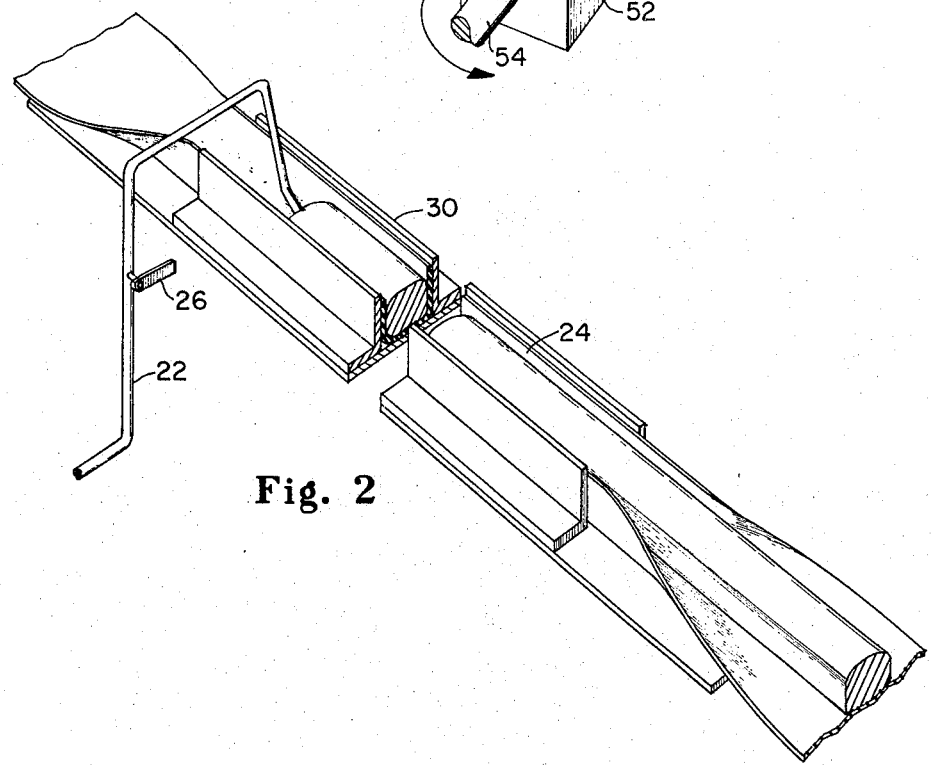

United States Patent Office 3,486,908
Patented Dec. 30, 1969

3,486,908
PROCESS FOR PREPARING PASTRY CRUST MIXES
William T. Bedenk, Springfield Township, Hamilton County, and James E. Luebering, Cincinnati, Ohio, assignors to The Procter & Gamble Company, Cincinnati, Ohio, a corporation of Ohio
Filed June 16, 1966, Ser. No. 557,979
Int. Cl. A21c 2/08
U.S. Cl. 99—94     6 Claims

ABSTRACT OF THE DISCLOSURE

Preparing a dry free-flowing pastry crust mix by employing a particular shortening that is normally in soft plastic condition but is temporarily maintained in uniformly firm plastic condition and mixing the firmed shortening with flour and other optional ingredients in a low intensity, long dwell time mixing step.

---

This invention relates to an improved process for preparing pastry crust mixes which can be formed into dough simply by admixing aqueous liquid, such as water, milk or the like.

The present mixes comprise flour and shortening. They are dry and free-flowing and can be easily poured or otherwise removed from their container. The term "dry" is used herein to denote the apparent absence of water. A "dry" mix can, however, contain up to about 10% by weight moisture which is present principally in the flour ingredient. The term "free-flowing" denotes a pourable quality.

Pastry crust doughs are ordinarily prepared in a two-step process. In the first of these steps, shortening and flour are blended until a substantially uniform shortening-flour mixture is achieved. In the second of these steps, water is added to the dry mix resulting from the first step and this combination of ingredients is mixed until the water is absorbed by the flour. This invention is particularly concerned with the first of these steps. It provides a dry mix which is adapted to be processed through the second step in order to provide a dough that is suitable for baking to yield a finished pastry crust.

The various crust properties affected by the shortening and by the combining and mixing operations of step one include tenderness (vis-a-vis toughness) and flakiness (vis-a-vis mealiness). As used herein the term "tenderness" denotes ease of crust breakage under shear and is opposed to the term "toughness." The term "flakiness" is used herein to denote the degree to which crusts are composed of thin, laminar, friable sheets of baked dough. When a flaky crust is broken, these sheets are apparent in cross-section. On the other hand, a mealy crust exhibits little laminar structure.

Tenderness depends in part upon the consistency and distribution of the shortening ingredient in the mix. In general, the softer the shortening, the more tender the crust. In all cases, sufficient greased flour (that is, flour which is "wetted" by or has absorbed shortening) must be uniformly distributed through the mix to preclude formation of excess paste on water addition; otherwise, on baking, such a combination of ingredients provides a crust with tough areas.

Flakiness, a crust characteristic esteemed by housewives and bakers, is dependent upon the particle size and distribution of the shortening in the mix, which in turn is dependent upon the consistency of the shortening ingredient and upon the type and degree of mixing. A mix capable of producing a flaky crust can be obtained by mixing plastic shortening together with flour for a period of time just sufficient to reduce the shortening to small lumps with a cutting rather than a smearing type of mixing. On the other hand, if the shortening and flour are thoroughly blended to form greased flour exclusively, the mix provides a mealy crust. Soft shortenings such as those usually needed for tender crusts increase the chance of formation during mixing of excess greased flour, thereby forming a mix that provides a mealy crust. Extended or intense mixing can also cause an excess of greased flour.

Thus, the preparation of a dry mix that provides a crust which is both tender and flasky involves problems of shortening selection and mixing.

Small scale preparation of such a mix by the housewife is possible with careful mixing using any of a number of commercially available plastic shortenings.

A process for the rapid, continuous or semi-continuous preparation of such dry mixes is disclosed and claimed in the copending application of Edward E. Colby and August Kokal, Jr., Ser. No. 448,313, filed Apr. 15, 1965, now U.S. Patent No. 3,384,494. This process requires the use of a particular shortening composition and comprises four separate steps, each of which is essential to the desirable end product and each of which has critical limits. In general, this process comprises the steps of (1) temporarily firming a certain shortening composition to a specified penetration value, (2) size-reducing the temporarily firmed shortening into pieces of relatively small size previous to mixing, (3) mixing these pieces of shortening with flour in a low intensity, long dwell time stage in a high holdup continuous mixer, and (4) further mixing the blend from the previous mixing step in a high intensity, short dwell time stage in a low holdup continuous mixer.

In the improved process of the present invention, the shortening is *uniformly* firmed in a unique manner. This results in the elimination of one of the two required mixing stages of the Colby and Kokal process and of the requirement that the shortening be in pieces of relatively small size before being introduced into the mixing step. Moreover, even if relatively small pieces of shortening are employed together with two mixing stages, the unique firming step of the present invention introduces flexibility into the process whereby excellent quality control is achieved.

Accordingly, it is an object of this invention to provide a process for the rapid, continuous or semi-continuous preparation of dry mixes which provide pastry crusts which are both tender and flaky.

It is another object of this invention to provide a process in which a particular plastic shortening is blended with flour in a novel combination of processing operations to provide dry mix.

These and other objects will be apparent after referring to the following specification and drawings, the details of which are hereinafter more fully described.

FIGURE 1 is a perspective view of a portion of the processing apparatus utilized and more fully described in Example I, which illustrates a preferred embodiment of this invention.

FIGURE 2 is a perspective view, partly broken away, of the moving trough utilized for continuous firming of shortening in the examples and more fully described in Example I.

FIGURE 3 is a perspective view of a portion of the shafts and mixer blades of the high holdup continuous mixer utilized in the examples and more fully described in Example I.

It is has been discovered that by employing a particular shortening that is normally soft but is temporarily maintained in a uniformly firm condition during mixing with flour and other optional ingredients in a low intensity, long dwell time step, a delicate compromise can be achieved in the desirable properties of the ultimate crust, combining tenderness, normally incidental to soft shortening and severe mixing of flour and shortening, with flakiness, normally incidental to discrete shortening particles and gentle mixing.

In the present process a particular shortening composition is uniformly firmed in a unique manner. The firmed shortening is mixed with flour and optional dry ingredients in a continuous mixing step. When the required degree of mixing is achieved, the resultant mix can be cooled before being packaged.

A shortening composition having a Solids Content Index (SCI) value at 70° F. ranging from about 12 to about 17 is used herein. SCI values are measured herein by the dilatometric method of Fulton, Lutton and Willie, JAOCS, 31, 98 (1954).

This shortening is temporarily firmed to a uniform harder plastic state as will hereinafter be described that makes it suitable for further processing. It is converted in a required manner during mix storage to a softer plastic state.

In addition to the described SCI value at 70° F., a shortening composition which has an SCI value at 92° F. ranging from about 8 to about 14, an SCI value at 105° F. ranging from about 4 to about 9, an I.V. ranging from about 78 to about 88 and a melting point ranging from about 115° F. to about 125° F. is preferred since it is high temperature resistant and therefore provides an extremely stable mix.

In general, the above shortening compositions comprise from about 5% to about 10% hard stock and from about 90% to about 95% base stock. All percentages and parts stated herein are by weight unless otherwise specified.

Hard stocks suitable for use in these shortening compositions are normally solid substantially fully saturated fatty triglycerides. These triglycerides include substantially completely hydrogenated cottonseed oil, soybean oil, rapeseed oil, palm oil and tallow. For example, cottonseed oil hydrogenated to an iodine value of less than about 12 can be used herein as hard stock.

The base stock preferred for use in the present shortening composition is any liquid glyceride vehicle having an SCI value at 70° F. ranging from about 4.5 to about 10 and an iodine value ranging from about 85 to about 92. Base stocks having SCI values above about 20 at 70° F. and iodine values below about 50 provide a shortening composition which imparts a waxy taste to the pastry crust.

Liquid triglyceride oils suitable for use as base stocks include, for example, those derived from soybean oil, cottonseed oil, corn oil, safflower oil, wallflower seed oil, sunflower seed oil, and peanut oil. A liquid triglyceride mixture of soybean oil and cotton seed oil, in weight ratios of about 15:1 to about 1:5 soybean oil to cottonseed oil, having an SCI value at 70° F. ranging from about 6 to about 8.5 and an iodine value of about 88 is especially preferred.

In addition to the above described hard stock and base stock, a shortening composition can contain about 30 p.p.m. butylhydroxyanisol or other conventional antioxidant and about 38 p.p.m. of a coloring agent such as carotene to provide an orange-yellow color to the crust.

In processing the above described shortening composition in the present process, it is first uniformly and temporarily firmed to a penetration value at mixing temperature ranging from about 50 mm./10 (tenths of a millimeter) to about 120 mm./10, preferably about 70 mm./10, before further processing to insure proper mixing to provide a dry mix that produces a tender, flaky crust. The term "uniformly" is used herein to refer to the uniformity of the consistency of the shortening. The uniformly firmed shortening has substantially the same penetration at any point along the surface or cross section of the shortening. Penetrations are measured with the aid of an A.S.T.M.-type penetromer employing a cone-shaped stainless steel needle. The needle and its shaft weigh 47 grams and drop 20 mm. onto the sample surface. The taper on the cone is 8° with its vertical axis. Mixing temperature is the temperature of the shortening entering the mixing step.

Because of this uniform firming which is the key to the present invention, the extreme criticality of control of the other processing steps which is required in the previously described Colby and Kobal process is diminished. It is now possible even to adjust the degree of mixing in the low intensity mixing step to eliminate shortening size reduction previous to mixing of shortening and flour and a second mixing stage as required by the Colby and Kokal process. In short, the present uniform firming step has made a very large contribution to the efficiency and simplicity of continuous dry mix processing and to better control of mixing during this processing.

The present method for uniformly and temporarily firming the shortening composition for further processing comprises the steps of supercooling the shortening composition which has previously been melted and continuously casting this supercooled composition.

In this firming method, the shortening is first melted and the melt supercooled to a temperature ranging from about 35° F. to about 70° F., preferably about 55° F., by rapid pumping through a scraped wall heat exchanger. The supercooled shortening is continuously cast by allowing it to crystallize for a period of time ranging from about 2 minutes to about 4 minutes while in a condition of plug flow whereby uniform firming is achieved. More particularly, the supercooled shortening is continuously cast in a moving trough having flexible walls which can be peeled away after the shortening has firmed to provide access for equipment which is needed to reduce the size of the shortening previous to mixing. During casting, the flexible walls can be held in proper shape by fixed guides. The movement of the trough walls at the same speed as the shortening so that there is no relative motion substantially eliminates friction at the wall-shortening interface and assures plug flow. The residence time of the shortening in the moving trough provides the specified crystallization or firming period. Preferably, a U-shaped trough is employed and the shortening is cast as a continuous moving rod. The phrase "plug flow" is used herein to denote movement as a solid core.

The shortening composition, uniformly and temporarily firmed as above, can be fed directly into the mixer, especially if the shortening emerges as a continuous moving rod. Alternatively, the uniformly firmed shortening composition can be reduced in size and formed into discrete pieces previous to mixing with flour and other optional ingredients. For example, the uniformly firmed shortening composition can be formed into pieces which have structural integrity and having their smallest dimension not exceeding about two inches, the other dimensions ordinarily ranging from about one-fourth to about 16 inches. This forming can be achieved by any method which substantially leaves intact the crystalline structure of the temporarily firmed shortening composition, for example, by slicing with a rotating blade as the shortening is discharged from the moving trough after crystallization. The phrase "pieces which have structural integrity" is used herein to denote shortening pieces which are firm enough to retain their shape under normal temperature conditions i.e., from about 60° F. to about 100° F.

The shortening in uniformly and temporarily firmed state is mixed with flour and optional dry ingredients in a single essential mixing step. The shortening composition comprises about 25% to about 45% of the ingredients which are mixed. The flour to shortening ratio ranges from about 1.2:1 to about 2.3:1. Optional dry ingredients can be added together with the flour to provide specific effect. For example, sugar can be added in amounts ranging up to about 8% by weight of the flour to provide flavor and crust color. Salt can be added in amounts ranging up to about 4% by weight of the flour to provide flavor. Minor amounts of milk or whey solids can be added to provide crust color and minor amounts of propionates or similar compounds can be included to retard mold growth.

The preferred proportions of ingredients to be mixed are as follows: shortening, 38.5 parts; flour (on a 14% moisture-containing basis), 60 parts; salt, 1.5 parts; all by weight.

In the essential mixing step, the shortening is gently and grossly mixed with the above described proportions of dry ingredients in a low intensity, high holdup (long dwell time) continuous mixer. High holdup continuous mixers are discussed in Perry's Chemical Engineer's Handbook 4th ed., McGraw-Hill, 1963, at pages 21–43. These low intensity mixers supply a small amount of power to a large amount of material. These mixers contain agitating mechanisms for supplying shearing and smearing forces to the ingredients and conveying mechanisms for moving the ingredients through the mixer. As a result of the shearing forces, the shortening is reduced in size; as a result of the smearing forces, part of the shortening and part of the flour are intimately mixed to form greased flour.

The ingredients are mixed in the high holdup mixer for about one to about fifteen minutes. Ordinarily, this mixing is carried out at room temperature. This mixing produces a grossly homogeneous mixture comprising from about 10% to about 50% greased flour and from about 5% to about 25% shortening in the form of discrete lumps not exceeding about one-half inch in diameter; and the balance is substantially shortening-free flour. At least about 10% greased flour is necessary to guard against excess paste formation and resulting tough crust areas. More than about 50% greased flour provides a mealy crust. From about 5% to about 25% shortening lumps are necessary for a flaky crust. Optional dry ingredients and moisture are considered part of the flour, including the flour in the greased flour, herein.

In the preferred high holdup mixing step a twin-shaft continuous shallow paddle mixer is employed. Twin-shaft mixers ranging from about two to about twenty feet in length are satisfactory. The shafts are counter-rotated, each turning at speeds ranging from about 20 to about 200 r.p.m. The paddles extend from each shaft. They are located at intervals along the length of the shafts and are synchronized to intermesh in the central portion of the mixer. Some of these paddles are pitched at an angle to the shaft; the balance of the paddles are unpitched and extend perpendicularly from the shafts at an angle of zero degrees to a plane perpendicular to the shaft axis. The pitched paddles provide conveying and transporting means for the mixed material. The unpitched paddles provide size-reduction and smearing action.

Other high holdup continuous mixers which can be adapted for use herein include, for example, the following continuous mixers: single-shaft canted paddle mixers, interrupted flight ribbon mixers and counter-rotating concentric shaft ribbon/saddle mixers.

For added flexibility and control, the mix emerging from the high holdup mixer is optionally fed into a high intensity, low holdup (short dwell time) continuous mixer. Low holdup continuous mixers are discussed in Perry's Chemical Engineers' Handbook 4th ed., McGraw-Hill, 1963, at pages 21–43. These high intensity mixers supply a large amount of power to a small quantity of material. These mixers contain mechanisms for supplying shearing, smearing and especially impacting forces to the ingredients. As a result of the shearing forces, at least some of the remaining shortening pieces are reduced in size. As a result of the smearing forces, some of the remaining free shortening and some of the remaining substantially shortening-free flour are intimately mixed to form more greased flour. If a low holdup mixer is employed, the ingredients are mixed in this type of mixer for from about one to about five seconds. If such an additional mixing step is employed, however, the final dry mix composition requirements are nevertheless the same.

In a preferrd high intensity, low holdup mixing step a variable speed impact mill and more especially a hammermill is employed. In general, from about 2,000 to about 15,000 impacts are supplied to each pound of mix. Mill speeds ranging from about 800 to about 2,000 r.p.m. are employed. In the hammermill the ingredients are fed onto a set of rotating blades whereby some of the shortening particles are reduced in size, more greased flour is formed and the mix ingredients are subjected to impacting forces.

The dry mix emerging from the final mixing step (either high holdup or low holdup) is preferably immediately cooled below about 60° F. This cooling removes heat supplied to the mix as mixing energy and thereby prevents even slight further flour-greasing and insures quality control. Dry Ice or liquid carbon dioxide can be used for cooling. The liquid carbon dioxide is simply sprayed onto the emerging mix.

After processing of the dry mix has been completed, it can be used immediately to form dough. However, a more tender crust is achieved if the dry mix is used to form dough after the firmed shortening in the mix softens. The shortening softens to a penetration ranging from about 120 mm./10 to about 300 mm./10 within about one day after mixing is complete. The exact penetration achieved during the one-day period after completion of mixing depends upon the particular shortening composition present and upon the degree of temporary firming to which it has been subjected. For example, a shortening composition which was temporarily firmed to a penetration of about 120 mm./10 can soften to a higher penetration, e.g., 200 mm./10, within the one-day post-mixing period.

The housewife adds a conventional amount of water to this dry mix and with conventional techniques forms a pastry dough. Ordinarily, added water comprises 10% to 25% of the wetted mix. The dough is rolled, for example, to one-eighth inch thickness and is placed in a pie plate for addition of filling before baking. The dry mix can be continuously converted into pastry dough by a process disclosed in the copending application of Clyde C. Lawnicki, Ser. No. 448,279, filed Apr. 15, 1965.

The following examples are illustrative of the scope of the invention and are not to be construed in any way as limiting its scope.

Example I

A pastry crust dry mix is made having the following composition:

| | Parts |
|---|---|
| Shortening | 38.5 |
| Flour containing about 14% moisture | 60.0 |
| Salt (sodium chloride) | 1.5 |

The shortening composition is made up from the following proportions of ingredients:

| | Parts |
|---|---|
| Hydrogenated cottonseed oil (I.V. equal to 8) | 7.5 |
| Partially hydrogenated ingredients: [1] | |
|     Cottonseed oil (SCI at 70° equal to 22) | 10.8 |
|     Soybean oil (SCI at 70° F. equal to 5) | 81.7 |
| Butylhydroxyanisol p.p.m. | [2] 30 |
| Carotene p.p.m. | [2] 38 |

[1] These two partially hydrogenated ingredients comprise the base stock and together have an SCI value at 70° F. of 6.3 and an I.V. equal to about 88.

[2] Based on oil mix.

The shortening composition has the following properties:

| | |
|---|---|
| SCI at 70° F. | 14.5 |
| SCI at 92° F. | 10.1 |
| SCI at 105° F. | 5.8 |
| Melting point, ° F. | 118 |
| I.V. | 83–86 |

The pastry crust dry mix is prepared with the processing apparatus depicted in FIGURES 1 and 2. With continuing reference to these figures, the shortening composition is melted by heating in stainless steel tank 12 for about 30 minutes at a temperature of 130° F. This melted shortening is allowed to flow through pipe 14. It is then pumped through pipe 18 and scraped wall heat exchanger 20. In this scraped wall heat exchanger the melted shortening is rapidly chilled to 55° F. to supercool it. The rapidly chilled shortening, still in liquid condition, is then pumped through pipe 22 into moving trough 24, the flow rate being controlled by valve 26. All pumping action up to this point is supplied by pump 16.

Moving trough 24 is substantially N-shaped in cross section. It has a width of 1.5 inches and an effective length of 8 feet. It has flexible walls which are held in place by rigid guides 30. These flexible walls peel away at the discharge end of the trough. The rapidly chilled liquid shortening from pipe 22 fills the bottom of the trough 24 and is carried along by the trough as it moves whereby a moving rod of solidifying shortening having a roughly circular cross-sectional area of two square inches is formed. In other words, the liquid shortening from pipe 22 is continuously cast in moving trough 24. The trough walls move at the same speed as the shortening rod so that there is no relative motion; thus, interface friction is substantially eliminated and plug flow of shortening achieved. While in moving trough 24 the shortening is allowed to crystallize for 3 minutes. The shortening discharged from the trough is uniformly and temporarily firmed to a penetration of 85. The shortening is discharged from the trough at a flow rate of 1.3 pounds per minute.

The shortening emerging from trough 24 is directed by guide 32 and is then sliced into slabs of one-eighth inch thickness by rotating blade 34. The slabs fall into mixer 50 described below.

High grade hard wheat flour containing about 14% moisture is premixed with salt in a ribbon mixer (not depicted) in proportions of 40:1 by weight. This salt-flour premix is fed at the rate of 2.05 pounds per minute into the same mixer 50 with the slabs of shortening.

The salt-flour premix is fed into mixer 50 by a flour-feeding apparatus comprising funnel-shaped hopper and sifter 36, vibrating chute 38, weighing and dumping member 40, and vibrating feeder chute 42.

The shortening and flour-salt premix are continuously fed into twin-shaft continuous shallow paddle mixer 50. The mixer is 48 inches in length. The shafts are counter-rotated, each turning at a speed of 90 r.p.m. A portion of the shafts and mixer blades and the relationship of the mixer blades are shown in FIGURE 3. With reference to FIGURE 3, the shafts 52 are square and are trained on trunnions 54. The pitched paddles 56 and the unpitched paddles 58 are located at intervals along the lengths of shafts 52 and intermesh between the shafts.

Referring again to FIGURE 1, in mixer 50 all portions of the shortening and flour-salt premix are gently and grossly mixed for about 3 minutes.

The mix emerging from mixer 50 contains 40% substantially fat-free flour, 20% free shortening and 40% greased flour. Salt and moisture are calculated as part of the flour. The free shortening is present in the form of discrete lumps having diameters ranging up to about one-fourth inch.

The emerging dry mix is sprayed with liquid carbon dioxide and cooled at 50° F. The cooled mix is packaged.

The packaged mix is stored at room temperature for two days and then opened. The shortening in the mix has softened to a penetration value of 150 mm./10.

Three hundred forty grams of mix from an opened package are mixed in a bowl with 60 gms. of water to form dough. The water is added all at once and is blended into the dry mix with a fork. The mixing is kept at a minimum and is just sufficient for all the water to be absorbed.

Two hundred grams of dough is gathered into a ball and the ball is rolled around in one gram of wheat flour on a rolling board until the ball is coated with flour. The flour-coated ball is formed into a disc by pressing it firmly into shape by hand. The disc is rolled on a rolling board with a rolling pin to form a sheet of dough about one-eighth inch thick. The sheet of dough is placed in a nine-inch pie pan and the dough is trimmed even with the pan edge with a spatula. The dough sheet is then pricked with a fork so as to expose the pie pan in several locations. The dough is then baked in an electric oven at 450° F. for 11 to 12 minutes and a golden yellow tender, flaky crust results.

In another case, crust is made exactly as described above from dry mix that had been stored for four weeks at 100° F. Crusts are also made with two commercially available pie crust mixes according to the directions on the packages. One of these mixes is the solid block type wherein the shortening is totally present in the greased flour (denoted as mix A hereinafter). The other mix (denoted as mix B hereinafter) is of the dry, free-flowing type. The shortening in this mix B comprises lard and a minor proportion of substantially completely hydrogenated lard in flake form, known as "lard flakes."

The dry mix of this invention that has been subjected to a 100° F. storage temperature for four weeks provides an outstanding tender crust which is substantially more flaky than the crusts from mixes A and B. Crust A tends to be mealy in its characteristics and crust B scores lower than the crust of the dry mix of this invention in both tenderness and flakiness.

In still another case, dry mix emerging from mixer 50 above is passed through a hammermill for purposes of added control. In the hammermill, a Fitzpatrick "Model U Granulator," the ingredients are intensely mixed for about one second at a mill speed of 1200 r.p.m. A total of about 6000 impacts is supplied to each pound of mix. Crust made from this mix is exactly the same way as crust made above from the dry mix of this invention is tender and flaky.

Example II

A pastry crust dry mix is made by exactly the same processing steps and under the same conditions as in Example I. The mix has a composition similar to the mix of this invention described in Example I except that the shortening composition is made up from the following proportions of ingredients:

| | Parts |
|---|---|
| Hydrogenated cottenseed oil (I.V. equal to 8) | 7.0 |
| Partially hydrogenated ingredients: [1] | |
|    Cotton seed oil (SCI at 70° F. and equal to 5) | 65.4 |
|    Soybean oil (SCI at 70° F. equal to 22) | 27.6 |

[1] These two partially hydrogenated ingredients comprise the base stock and together they have an SCI value at 70° F. of 8 and an I.V. equal to about 88.

The shortening composition has the following properties:

| | |
|---|---|
| SCI at 70° F. | 14.5 |
| SCI at 92° F. | 10.0 |
| SCI at 105° F. | 5.8 |
| Melting point, ° F. | 118 |
| I.V. | 83 |

The dry mix provides tender, flaky crusts.

Example III

A dry mix is made as in Example I except that the shortening slicing and shortening-flour mixing are carried out as follows: The shortening emerging from the moving trough is sliced into pieces having a cross-sectional area of 2 square inches and a thickness of 1.5 inches. The shortening pieces are fed at the same rate and are mixed with the same proportions of flour and salt as in Example I in the twin-shaft continuous mixer of that example. The shafts are counter-rotated, each turning at a speed of 70 r.p.m. All portions of the shortening and flour-salt premix are gently and grossly mixed in this mixer for about 4.5 minutes. The formed mix has a composition exactly the same as the mix made by the process of this invention described in Example I. Crust made from this mix is tender and flaky.

Example IV

A dry mix made as in Example I except that the firmed shortening is fed directly into the mixer without previous size reduction and mixing is carried out as follow: The shortening is fed at the same rate and is mixed with the same proportions of flour and salt as in Example I in the twin-shaft continuous mixer of that example. The shafts are counter-rotated, each turning at a speed of 65 r.p.m. All portions of the shortening and flour-salt premix are gently and grossly mixed in this mixer for about 5 minutes. The formed mix has a composition exactly the same as the mix made by the process of this invention described in Example I. Crust made from this mix is tender and flaky.

Other high holdup continuous mixers such as, for example, single shaft canted paddle mixers can replace the twin-shaft continuous paddle mixer of Example I with substantially similar results.

A filling such as blueberry filling can be placed in the panned dough sheet produced from the dry mixes of this invention prepared in the above examples and then baked to yield a pie having a tender, flaky crust.

What is claimed is:

1. A process for preparing a dry, free-flowing pastry crust mix, said process comprising the following steps:
    (A) temporarily and uniformly firming to a penetration value ranging from about 50 mm./10 to about 120 mm./10, a shortening composition having an SCI value at 70° F. ranging from about 12 to about 17, said firming being conducted by a process comprising the following steps:
        (1) melting the shortening composition;
        (2) supercooling the melted shortening composition to a temperature ranging from about 35° F. to about 70° F.;
        (3) continuously casting the supercooled shortening and allowing it to crystallize for a period of time ranging from about 2 to about 4 minutes while in a condition of plug flow whereby uniform firming is achieved; and
    (B) forming the temporarily and uniformly firmed shortening into discrete pieces having their smallest dimension not exceeding about two inches and having their other dimensions ranging from about one-fourth to about 16 inches, the forming being achieved in such manner that the crystalline structure of the firmed shortening is substantially left intact, and mixing the firmed shortening pieces with flour in a high holdup continuous mixer in a ratio of flour to shortening of from about 1.2:1 to about 2.3:1 for about one to about 15 minutes until the mixture of shortening and flour comprises from about 10% to about 50% greased flour and from about 5% to about 25% shortening in the form of discrete lumps not exceeding about one-half inch in diameter; the balance of the mixture being substantially shortening-free flour.

2. The process of claim 1 wherein in step (A) element (3), the supercooled shortening, is continuously cast as a moving rod in a moving trough so that there is no relative motion whereby friction at the trough wall-shortening interface is eliminated and plug flow is assured.

3. The process of claim 1 wherein the shortening composition to be uniformly and temporarily firmed has an SCI value at 92° F. ranging from about 8 to about 14, an SCI value at 105° F. ranging from about 4 to about 9, an I.V. ranging from about 78 to about 88 and a melting point ranging from about 115° F. to about 125° F. and the mix resulting from step (B) is immediately cooled below about 60° F.

4. The process of claim 1 wherein the high holdup continuous mixer is a continuous paddle mixer.

5. A process for preparing a dry, free-flowing pastry crust mix, said process comprising the following steps:
    (A) temporarily and uniformly firming to a penetration value ranging from about 50 mm./10 to about 120 mm./10, a shortening composition having an SCI value at 70° F. ranging from about 12 to about 17, said firming being conducted by a process comprising the following steps:
        (1) melting the shortening composition,
        (2) supercooling the melted shortening composition to a temperature ranging from about 35° F. to about 70° F.;
        (3) continuously casting the supercooled shortening as a moving rod in a moving trough so that there is no relative motion whereby friction at the trough-wall-shortening interface is eliminated and allowing the cast shortening to crystallize in the moving trough while in a condition of plug flow for a period of time ranging from about 2 to about 4 minutes;
    (B) feeding the continuous moving rod of uniformly and temporarily firmed shortening directly from the moving trough into a high holdup continuous mixer wherein the firmed shortening is mixed together with flour in a ratio of flour to shortening of from about 1.2:1 to about 2.3:1 for about one minute to about 15 minutes until the mixture of shortening and flour comprises from about 10% to about 50% greased flour and from about 5% to about 25% shortening in the form of discrete lumps not exceeding about one-half inch in diameter; the balance of the mixture being substantially shortening-free flour.

6. The process of claim 5 wherein the continuous moving rod of shortening has a cross-sectional area of about 2 square inches.

References Cited

UNITED STATES PATENTS

| | | | |
|---|---|---|---|
| 2,499,586 | 3/1950 | Johnson | 99—94 |
| 2,522,591 | 9/1950 | Wilson et al. | 99—92 |
| 2,686,721 | 8/1954 | Callaghan et al. | 99—94 |
| 3,255,016 | 6/1966 | Parker | 99—94 |

RAYMOND N. JONES, Primary Examiner

U.S. Cl. X.R.

99—118